US008471762B2

(12) United States Patent
Zietz et al.

(10) Patent No.: US 8,471,762 B2
(45) Date of Patent: Jun. 25, 2013

(54) GNSS ULTRA-SHORT BASELINE HEADING DETERMINATION SYSTEM AND METHOD

(75) Inventors: John M. Zietz, Fargo, ND (US); Robert M. Allen, Reiles Acres, ND (US); Robert V. Weinmann, Wahpeton, ND (US)

(73) Assignee: Appareo Systems, LLC, Fargo, ND (US)

( * ) Notice: Subject to any disclaimer, the term of this patent is extended or adjusted under 35 U.S.C. 154(b) by 0 days.

(21) Appl. No.: 13/413,481

(22) Filed: Mar. 6, 2012

(65) Prior Publication Data

US 2012/0218143 A1 Aug. 30, 2012

Related U.S. Application Data

(63) Continuation of application No. 12/563,893, filed on Sep. 21, 2009, now Pat. No. 8,130,142.

(51) Int. Cl.
*G01S 19/47* (2010.01)

(52) U.S. Cl.
USPC ....................................... 342/357.3

(58) Field of Classification Search
USPC ....................................... 342/357.3
See application file for complete search history.

(56) References Cited

U.S. PATENT DOCUMENTS

| 5,021,792 A | 6/1991 | Hwang |
| 5,430,654 A | 7/1995 | Kyrtsos et al. |
| 5,543,804 A | 8/1996 | Buchler et al. |
| 5,548,293 A | 8/1996 | Cohen et al. |
| 5,617,317 A | 4/1997 | Ignagni |
| 5,672,872 A | 9/1997 | Wu et al. |
| 5,757,316 A | 5/1998 | Buchler |
| 5,757,317 A | 5/1998 | Buchler et al. |
| 5,809,457 A | 9/1998 | Yee et al. |
| 5,831,572 A | 11/1998 | Damilano |
| 6,292,132 B1 | 9/2001 | Wilson |
| 6,336,061 B1 | 1/2002 | Deines et al. |
| 6,424,915 B1 | 7/2002 | Fukuda et al. |
| 6,611,228 B2 | 8/2003 | Toda et al. |
| 6,754,584 B2 | 6/2004 | Pinto et al. |
| 7,136,751 B2 | 11/2006 | Pinto et al. |

(Continued)

OTHER PUBLICATIONS

"HATS (Head Attitude Tracking System)", *SBIR Beyond Phase II Conference & Technology Showcase*, Orlando, FL, (Sep. 21, 2009), 1-2.

(Continued)

*Primary Examiner* — Harry Liu
(74) *Attorney, Agent, or Firm* — Law Office of Mark Brown, LLC; Jonathan Toldstedt

(57) ABSTRACT

A heading determination system comprises an inertial measurement unit (IMU) coupled with at least two GNSS receivers, each receiver paired with and receiving signals from a corresponding GNSS antenna, wherein the GNSS antennas are separated by an ultra-short baseline. The heading determination system receives signals broadcast by a plurality of GNSS satellites and calculates the phase difference in the signal seen among the separate GNSS antennas. Using this phase difference information, derived from comparing the signals received from a plurality of GNSS satellites, along with attitude data generated by the IMU, the heading determination system calculates a highly-accurate heading solution. A method is provided for determining a heading of a system including an IMU coupled with at least two GNSS receivers, with each receiver being paired with and receiving signals from a corresponding GNSS antenna and the antennas being separated by an ultra-short baseline.

1 Claim, 19 Drawing Sheets

U.S. PATENT DOCUMENTS

| | | | |
|---|---|---|---|
| 7,310,062 B1 * | 12/2007 | Hwang | 342/357.59 |
| 2008/0158256 A1 | 7/2008 | Russell et al. | |
| 2009/0231953 A1 * | 9/2009 | Welker et al. | 367/19 |
| 2009/0265104 A1 | 10/2009 | Shroff | |
| 2010/0131642 A1 | 5/2010 | Chalikouras et al. | |

OTHER PUBLICATIONS

"Head Attitude Tracking System (HATS)", *Quad Chart, disclosed to North Dakota Congreesional Delegation*, (Feb. 19, 2009),1.

"Innovation lightweight, low-cost UAS heading-attitude reference system", *NaviCube 1000, disclosed at Unmanned Aircraft Systems (UAS) conference*, Grand Folks, ND, (May 27, 2009),1.

"Innovative, lightweight low-cost UAS heading-attitude reference system", *Navicube disclosed at 2009 SBIR Beyons Phase II Conference & Technology Showcase*, Orlando, FL, (Sep. 21, 2009),1.

\* cited by examiner

GNSS ULTRA-SHORT BASELINE HEADING DETERMINATION SYSTEM AND METHOD

CROSS-REFERENCE TO THE RELATED APPLICATIONS

This application is a continuation of and claims the benefit of U.S. patent application Ser. No. 12/563,893, filed Sep. 21, 2009, now U.S. Pat. No. 8,130,142, issued Mar. 6, 2012, which is incorporated herein by reference.

BACKGROUND OF THE INVENTION

1. Field of the Invention

This invention relates to navigation and positioning systems, and more particularly to a system and method for calculating highly accurate heading information through the use of multiple GNSS receivers separated by a short distance.

2. Description of the Related Art

Systems for determining the heading of a moving body, such as a vehicle or a person, exist in the prior art. One such system is a magnetic compass, which is a navigational instrument for determining direction relative to the Earth's magnetic field. It typically consists of some form of freely-rotating magnetized pointer that can align itself with the Earth's magnetic field. However, solid state versions of the magnetic compass also exist, wherein solid state magnetic sensors are used to sense the compass's orientation relative to the Earth's magnetic field. In its original form, the magnetic compass is one of the oldest and least complex navigational instruments in existence.

Unfortunately, a magnetic compass is subject to several limitations. A magnetic compass may be affected by the presence of large amounts of metal, particularly ferrous metals used in a ship's hull or in the body of a ground vehicle or aircraft. A magnetic compass may also be skewed by large deposits of iron ore in the ground, such as that present in the Marquette Iron Range in Marquette County, Michigan.

Non-magnetic compasses have been developed to try to overcome the limitations of magnetic compasses. Gyro-compasses employ a fast-spinning wheel and the forces of friction to determine heading based on the rotational axis of the Earth. Although any gyro can act as a gyro-compass, because the earth's rate of rotation is small, very accurate gyroscopes such as fiber-optic gyroscopes (FOG) or laser ring gyroscopes are desirable. The gyro-compass can determine when it is aligned with the rotational axis of the Earth, and therefore provides true north as opposed to magnetic north. Because the operation of a gyro-compass depends on the rotation of the Earth, it will not function correctly if the vehicle or body to which it is mounted is moving fast in an east to west direction. The gyro-compass can be subject to errors caused by rapid changes in course, and the gyro-compass is subject to drift because of inertial effects on its mechanical parts and electrical measurement imperfections.

To avoid the problems of drift caused by mechanical parts, some systems employ a ring laser gyroscope or fiber optic gyroscope. A ring laser gyroscope has no moving parts, but instead relies upon beams of laser light bouncing around a ring of mirrors in a device. The beams are channeled to a photo-detector. If the vehicle to which the ring laser gyroscope is mounted is not changing heading (not rotating), the light beams will remain in phase. If the vehicle or body is rotating, however, one of the beams will change phase with respect to the other. A fiber optic gyroscope works on a principle similar to the ring laser gyroscope, but the light is channeled through fibers.

However, ring laser gyroscopes and fiber optic gyroscopes are very expensive systems and therefore do not work well for all applications. In particular, building a head- or human-mounted heading determination system based on a ring laser gyroscope or similar system would not be practical or affordable.

Global navigation satellite systems (GNSS) such as the Global Positioning System (GPS) can be used to provide a form of heading when a vehicle or body is in motion. For example, if a single GNSS receiver can derive its position at one point in time, and then derive a second position at a point in time one second later, it can be assumed that the GNSS receiver moved from the first location to the second along a heading defined by a line from the first point to the second point.

However, GNSS-based systems using a single receiver and single antenna do not work when the vehicle or body is not moving. For example, if a helicopter is hovering in one spot (one GNSS location) for a period of time, there is no way to determine what direction that helicopter is currently pointed, as there is no movement from one spot to another with which to determine heading. Similarly, a head- or human-mounted GNSS system with a single receiver and single antenna cannot determine the human's heading when the human is standing in one spot. There is no way to tell which way the human is looking if they are not moving.

Prior art systems describe the use of two GNSS antennas separated by a short distance in an attempt to overcome the limitations of single-antenna GNSS systems. These two-antenna GNSS systems measure the difference in phase of a satellite signal as it is received by two antennas to attempt to derive the position and orientation of the system. However, these two-antenna systems are typically intended to be mounted in a known orientation and are subject to the affects of roll and pitch as the vehicle or body to which the system is mounted moves in space. It is very difficult to obtain a highly-accurate heading using a two-antenna GNSS system unless there is some mechanism for compensating for roll and pitch and other movements.

What is needed in the art is a highly-reliable heading determination system which uses at least two GNSS receivers with at least two corresponding GNSS antennas separated by an ultra-short baseline (typically less than 0.5 meters), coupled to an inertial measurement system to compensate for roll and pitch and which can be used on a body where the orientation of the body in space is highly dynamic, but the GNSS location of the body may be static for long periods of time.

SUMMARY OF THE INVENTION

According to one aspect of the present invention, a heading determination system is comprised of an inertial measurement unit coupled with at least two GNSS receivers, each receiver paired with and receiving signals from a corresponding GNSS antenna, wherein the GNSS antennas are separated by an ultra-short baseline. The heading determination system receives signals broadcast by a plurality of GNSS satellites and calculates the phase difference in the signal seen among the separate GNSS antennas. Using this phase difference information, derived from comparing the signals received from a plurality of pairs of GNSS satellites, along with attitude data generated by the inertial measurement unit, the heading determination system calculates a highly-accurate heading solution.

According to another aspect of the present invention, a heading determination system takes the form of an apparatus worn on the human head, such as a helmet, headphones, or any other type of mounting to a human head, wherein a first GNSS receiver is mounted to a first side of the apparatus and a second GNSS receiver is mounted to a second side of the apparatus, and an inertial measurement unit is mounted in the center of the apparatus, near the top of the head as worn by a user. The effective baseline width between the first GNSS receiver and the second GNSS receiver is variable, and depends on the shape and size of the head on which it is being worn, and so a means of determining the baseline width after it is in place is provided. This calculated baseline width is used in the calculation of a highly-accurate heading solution.

According to yet another aspect of the present invention, a heading determination system takes the form of a module or series of modules which may be rigidly mounted in a fixed configuration to a vehicle or platform, wherein a first GNSS receiver is mounted in a first fixed location relative to a second GNSS receiver in a second fixed location, separated by an ultra-short baseline, and an inertial measurement unit is mounted in a third fixed location relative to the first and second GNSS receiver locations. The heading determination system uses phase difference information derived from comparing the signals received from the GNSS satellites, along with attitude data generated by the inertial measurement unit, to calculate a highly-accurate heading solution.

These aspects and others are achieved by the present invention, which is described in detail in the following specification and accompanying drawings which form a part hereof.

DETAILED DESCRIPTION OF THE PREFERRED EMBODIMENTS

With reference now to the drawings, and in particular to FIGS. 1 through 14 thereof, a new ultra-short baseline (USBL) heading determination method and system embodying the principles and concepts of the present invention will be described.

Figure 1:
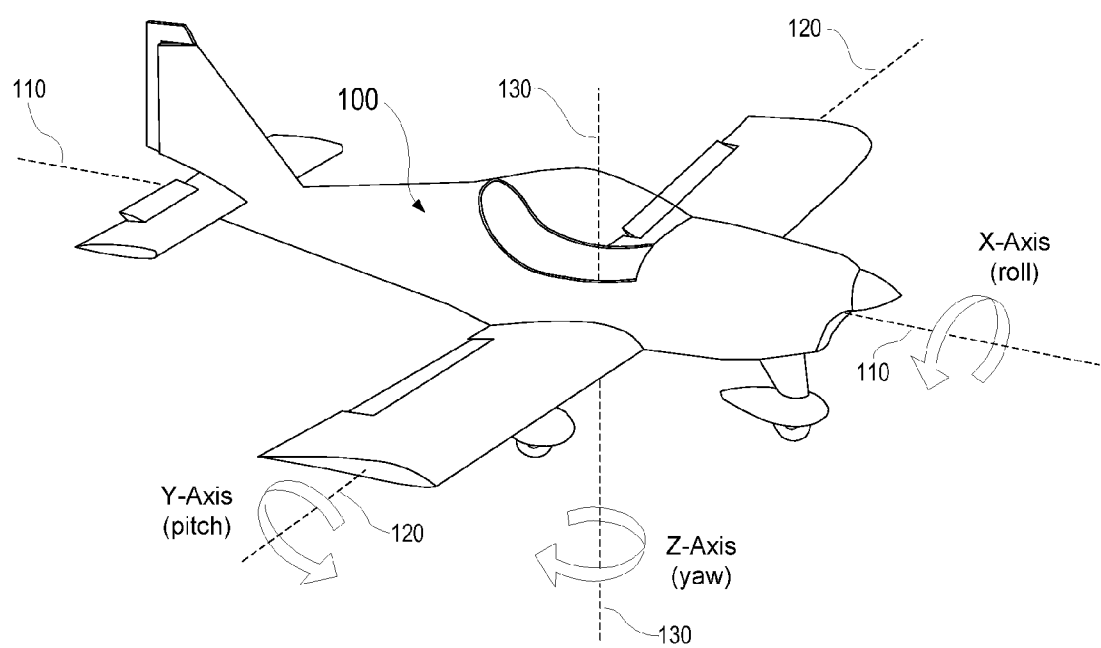
FIG. 1 illustrates the rotational axes considered when calculating a position, orientation, and heading solution for a vehicle such as an aircraft.

FIG. 1 illustrates the rotational axes considered when calculating a position, orientation, and heading solution for a vehicle 100 such as an aircraft. A vehicle 100 in motion is capable of rotation about three axes. The axis extending longitudinally through the length of the vehicle 100 from the nose (front) to its tail (back) is considered to be the x-axis 110. When the vehicle 100 rotates about the x-axis 110, the vehicle 100 is said to be experiencing "roll". The axis extending laterally through the vehicle 100, from one side to the other side (for example, from one wing to the other wing on an aircraft) is considered to be the y-axis 120. When the vehicle 100 rotates about the y-axis 120, the vehicle 100 is said to be experiencing "pitch". Finally, the axis extending down through the vehicle 100 from the top to the bottom is considered to be the z-axis 130. When the vehicle 100 rotates about the z-axis 130, the vehicle 100 is said to be experiencing "yaw".

Figure 2:
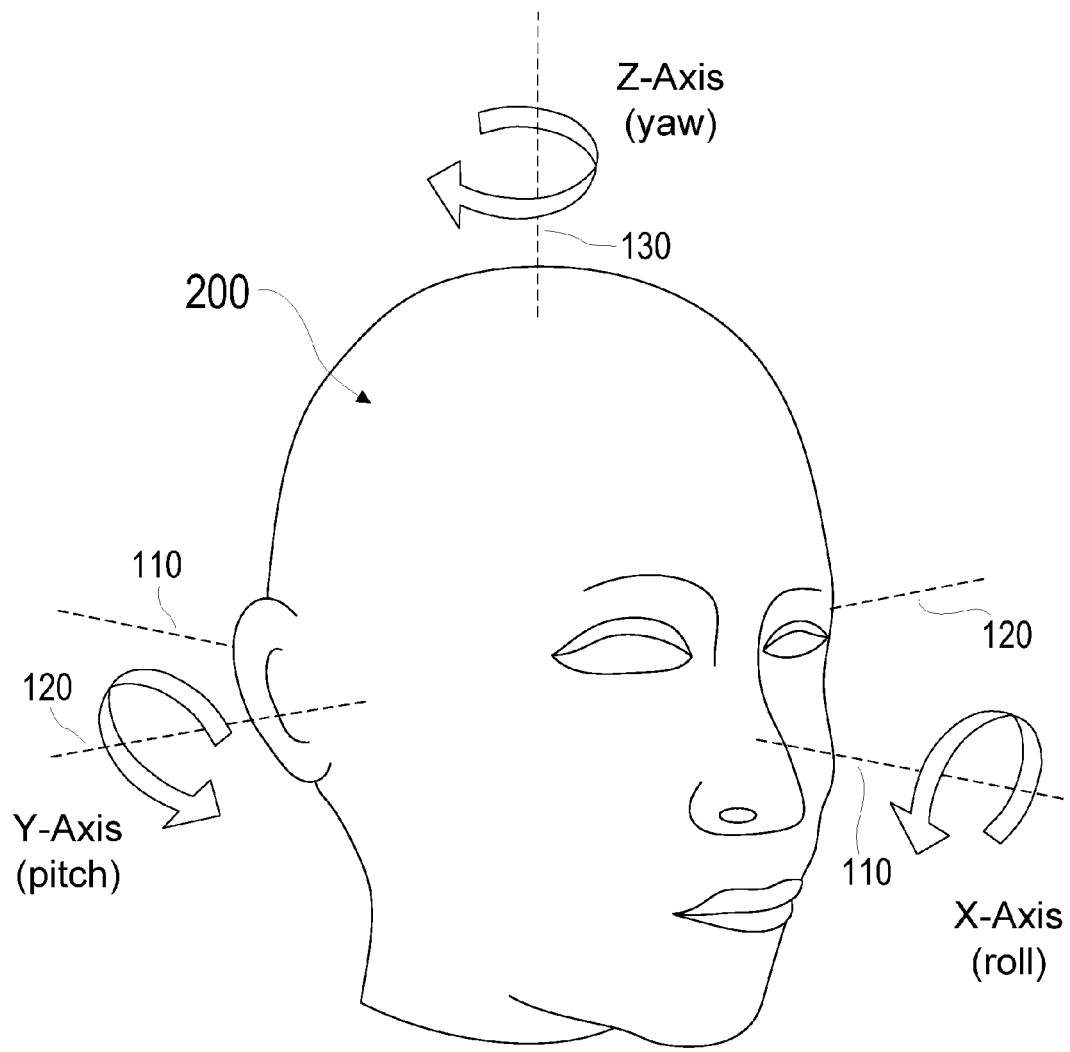
FIG. 2 illustrates the rotational axes considered when calculating a position, orientation, and heading solution for a small body such as a human head.

FIG. 2 illustrates the rotational axes considered when calculating a position, orientation, and heading solution for a small body 200 such as a human head. The axes defined for a small body 200 are identical to those defined in FIG. 1 for a vehicle 100, in which roll refers to rotation about the x-axis 110, pitch refers to rotation about the y-axis 120, and yaw refers to rotation about the z-axis 130. FIG. 2 is included only as a means of illustrating that the rotational axes defined for a vehicle 100 can apply equally well to other objects, such as the small body 200 (head) shown.

Throughout the remainder of this text, the terms roll, pitch, and yaw will be used to mean rotation about the x-axis 110, y-axis 120, and z-axis 130 respectively, as defined in FIG. 1 and FIG. 2.

Figure 3:
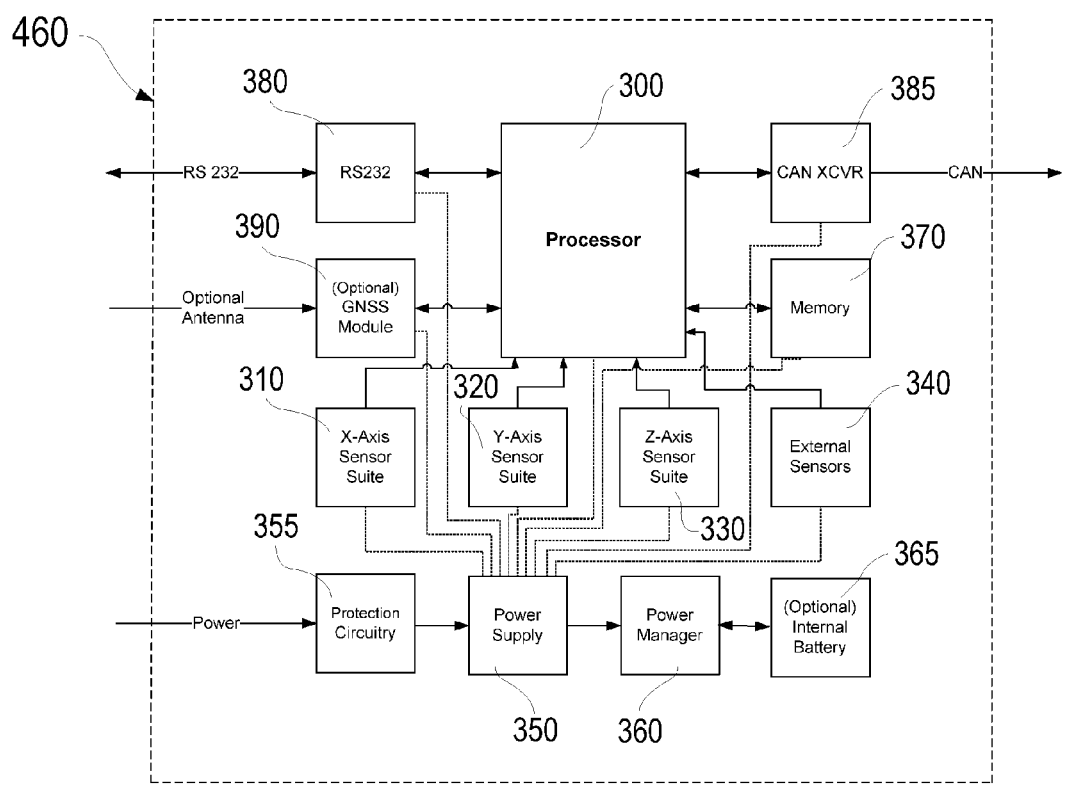
FIG. 3 is a high-level block diagram of an inertial measurement unit.
Figure 4A:
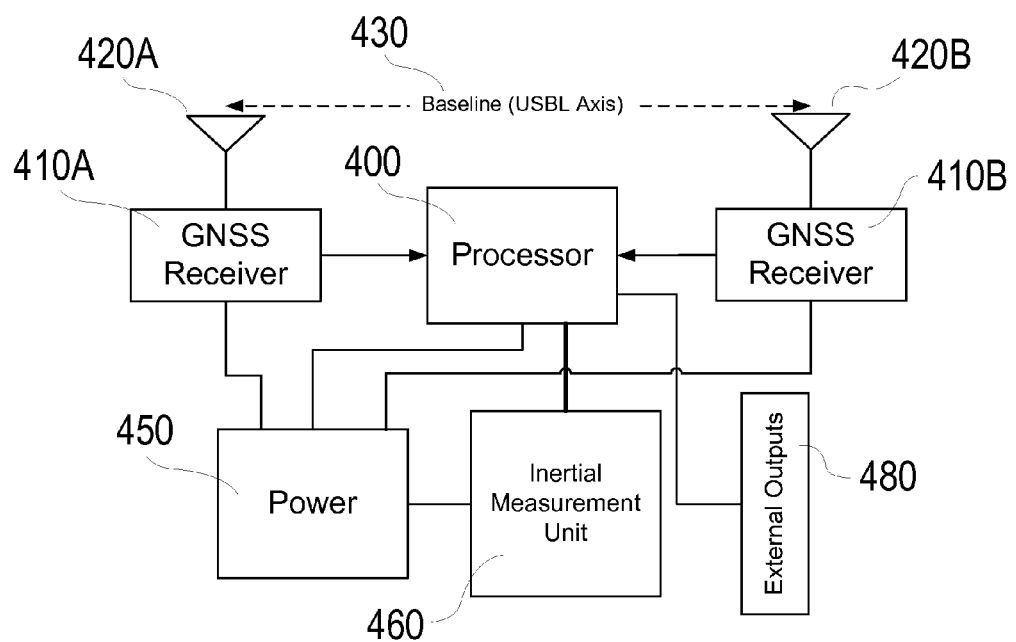
FIG. 4A is a high-level block diagram of a heading determination system based on GNSS receivers separated by an ultra-short baseline.
Figure 4B:
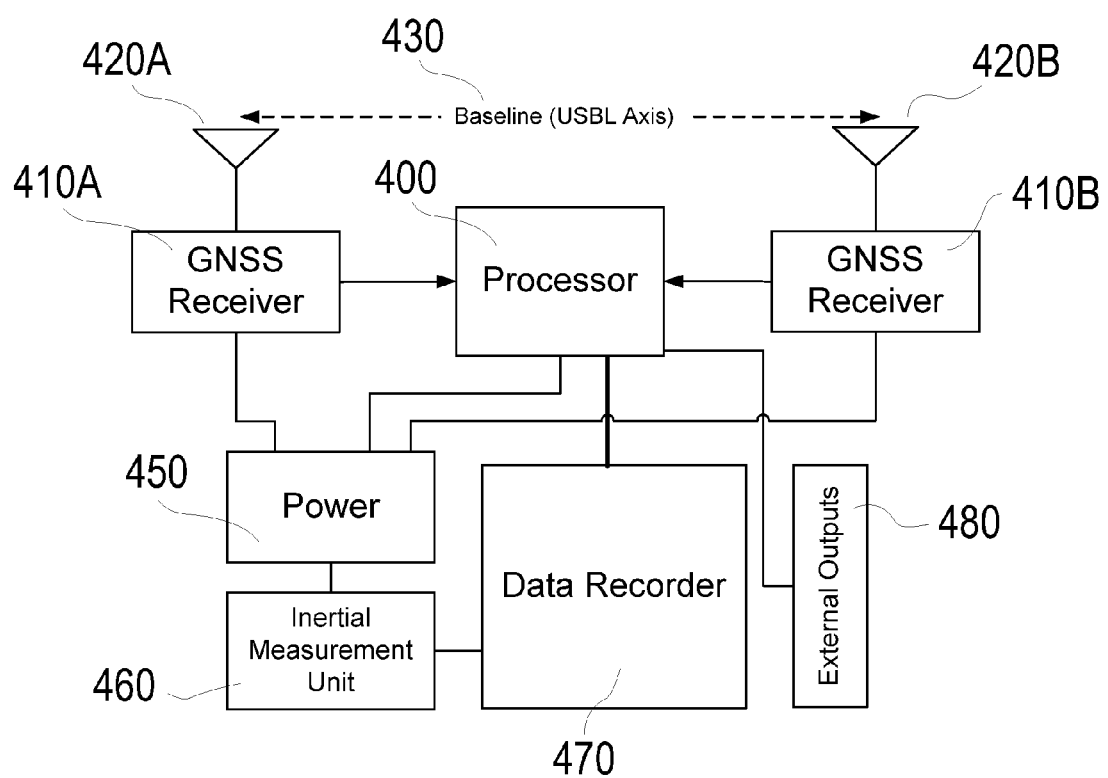
FIG. 4B is a high-level block diagram of a variation of the ultra-short baseline heading determination system of FIG. 4A including a data recording function.

Referring now to FIGS. 3, 4A, and 4B, an ultra-short baseline (USBL) heading determination system will be described. FIG. 3 provides a high-level block diagram of one embodiment of an inertial measurement unit 460 used by a USBL heading determination system. FIGS. 4A and 4B show alternate embodiments of a USBL heading determination system that contains the inertial measurement unit 460 of FIG. 3 as one of its primary components.

Referring now to FIG. 3, the inertial measurement unit (IMU) 460 consists of several functional blocks. A processor 300 controls all functions within the IMU 460 and collects data from the other functional blocks.

The X-axis sensor suite 310, the Y-axis sensor suite 320, and the Z-axis sensor suite 330 of the IMU 460 each contain similar sensing components but are mounted orthogonally to each other, one in each of the three spatial dimensions. In the preferred embodiment, each sensor suites 310, 320, and 330 contains accelerometers for sensing the magnitude of movement, gyroscopes for sensing the rate of rotation of the IMU 460 and the vehicle or moving body to which it is attached, and optionally may contain magnetic sensing elements for sensing the Earth's magnetic field. Each sensor suite 310, 320, and 330 also contains an analog-to-digital converter to convert the raw analog sensor values to digital signals which can be read by the processor 300.

In addition to receiving signals from the integrated sensor suites 310, 320, and 330, the processor 300 can be configured to receive and process signals from external sensors 340, for example, an outside air temperature (OAT) sensor, a rotor torque sensor as used on helicopters, and/or a pitot static system to stabilize altitude. The processor 300 can also be configured to receive and process signals from one or more operator switches (not shown) or other manual inputs. The types of sensors described herein are exemplary, and are not meant to be limiting in any fashion. Any appropriate external sensor may communicate with the inertial measurement unit 460.

In one embodiment, the IMU 460 receives location information, including latitude, longitude, and altitude, from an optional internal GNSS module 390. This GNSS module may receive information broadcast from a plurality of global positioning system (GPS) satellites, or from any other appropriate navigation satellite system. In alternative embodiments, the IMU 460 may not have an internal GNSS module 390, and may be used as a attitude determination device (without location) or coupled with a separate, external GNSS device.

The processor 300 can also process messages from external systems received by one or more built in transceivers. For example, in one embodiment, the processor 300 may receive messages from a Controller Area Network (CAN) transceiver 385, an RS232 serial communications module 380, or any appropriate module used for communications with external subsystems. The IMU 460 is capable of storing captured and derived data in internal memory 370.

In the preferred embodiment, the IMU 460 receives power from an appropriate power source (e.g., the power system of a vehicle or an external battery). This power is filtered through protection circuitry 355 which conditions the voltage for use. This protection circuitry 355 prevents damage caused by voltage spikes or other transient voltage conditions on the supplied power. A power supply 350 converts the voltage to the appropriate level for use in the IMU 460. The power is controlled by a power manager circuit 360, which is responsible for switching between the input voltage from the power supply 350 and from an optional internal battery 365.

FIG. 4A is a high-level block diagram of a heading determination system based on GNSS receivers separated by an ultra-short baseline. For the purposes of this specification, the term "ultra-short baseline", or USBL, shall be used to refer to a system with two or more GNSS antennas with a physical separation between or among the antennas of 0.5 meters or less. In some of the embodiments described herein, the actual baseline separation between GNSS antennas will typically be on the order of 20 to 25 centimeters, but separations up to 0.5 meters will be considered to be ultra-short baselines for the purposes of this discussion.

Referring now to FIG. 4A, the USBL heading determination system will consist of multiple functional blocks connected to and controlled by a processor 400. Two or more GNSS receivers will be connected to and sending information to the processor 400. In the preferred embodiment, there are two GNSS receivers, 410A and 410B, connected to GNSS antennas 420A and 420B, respectively. The antennas, 420A and 420B, are separated by less than 0.5 meters and therefore the baseline separation 430 is considered to be an ultra-short baseline as defined above.

The GNSS receivers 410A and 410B are electrically coupled with an inertial measurement unit (IMU) 460 to provide a complete heading determination system, the functional details of which are described in detail later in this document. In general terms, the USBL heading determination system combines distance measurements received from at least two separate GNSS receivers (410A and 410B, with other receivers added as appropriate in alternative embodiments) with attitude information derived from the IMU 460 to calculate a highly-accurate heading solution. This is done by comparing the differences in phase between the GNSS satellite signal received from one GNSS receiver 410A and the same signal received from a second GNSS receiver 410B. Because the two GNSS antennas 420A and 420B are separated by a short distance (the ultra-short baseline 430), they will each receive a signal sent by a GNSS satellite. When the signals reach the separate antennas provides position and distance information; the signals may arrive at the same time or at slightly different times. The difference in signal phases, along with attitude information from the IMU 460, is used to calculate a heading solution. This process is described in additional detail later in this document.

The processor 400, GNSS receivers 410A and 410B, and the IMU 460, receive power from a power source 450. This power source 450 may be external power (such as vehicle power or an external battery pack) or an internal power source, such as a battery built into the USBL heading determination system. The USBL heading determination system has the capability of outputting heading and attitude information through a plurality of external outputs 480.

FIG. 4B illustrates a variation on the USBL heading determination system of FIG. 4A. The primary difference in FIG. 4B from FIG. 4A is the addition of a data recorder 470, which is used to record the data captured and derived by the USBL heading determination system. The data captured by the data recorder 470 can be recorded for later playback or analysis by an external system. All other functional blocks shown in FIG. 4B are identical to those shown in FIG. 4A, and so will not be described again here.

It should be noted that some prior art systems attempt to determine attitude using a system which has multiple GNSS antennas separated by some distance (often not an ultra-short baseline) but only a single GNSS receiver. These prior art systems often describe the single receiver as a key feature and benefit of their system. However, when a single GNSS receiver is used with multiple GNSS antennas, the receiver must be specially designed with multiple channels (for receiving signals from multiple antennas) and must have a common clock signal. The need for a custom-designed single receiver eliminates the option of using commercial-off-the-shelf (COTS) GNSS receivers and introduces considerable cost into the system. This additional system cost may make a single-receiver system impractical or out of reach for many small applications.

In addition to the extra cost of the single-receiver system, using a single receiver will also require the use of long cables between the receiver and each of the antennas, introducing parasitic capacitance, propagation delays, and other problems associated with long cabling. If there is only one receiver, at least one antenna in the single-receiver system must be placed some distance away from the receiver.

In the present invention, there is one GNSS receiver paired directly with each GNSS antenna. This means that each antenna can be directly attached to a GNSS receiver, eliminating completely the need for cabling between the antenna and receiver, as well as the problems associated with these cables. Each receiver in the present invention can be a COTS receiver that outputs pseudorange and/or carrier phase measurements, significantly reducing the cost of the overall heading determination system.

Figure 5A:
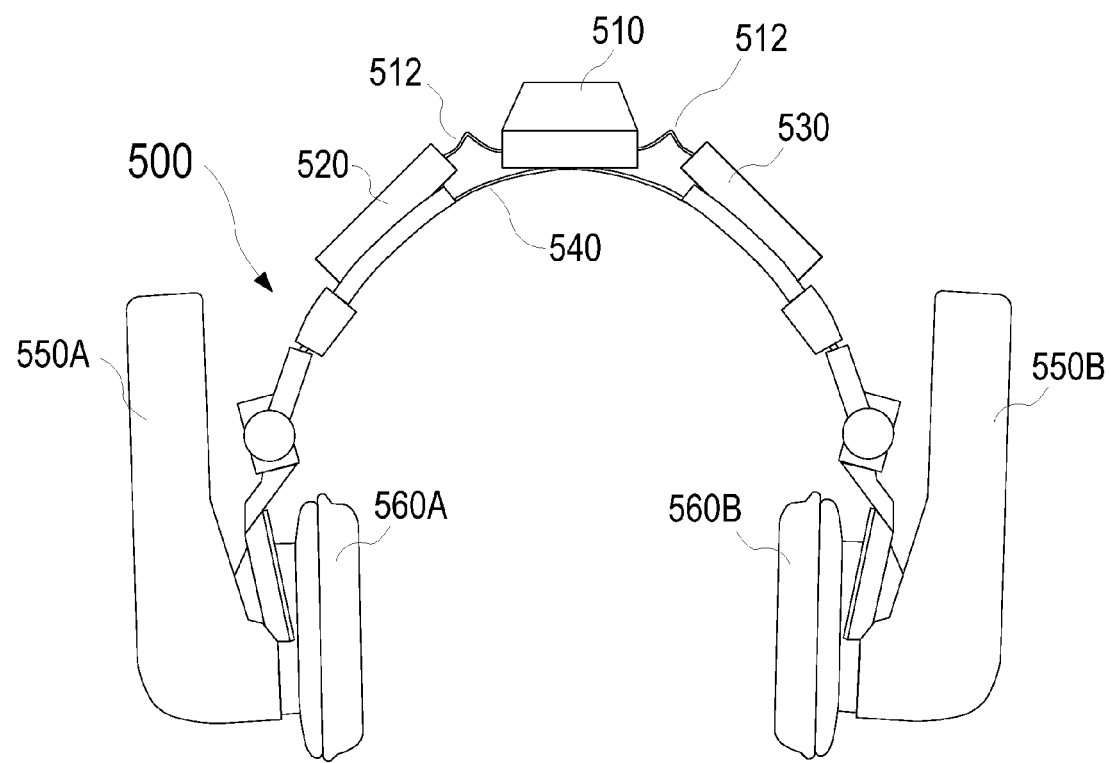
FIG. 5A is a front view of a head-mounted embodiment of the ultra-short baseline heading determination system of FIG. 4A.
Figure 5B:
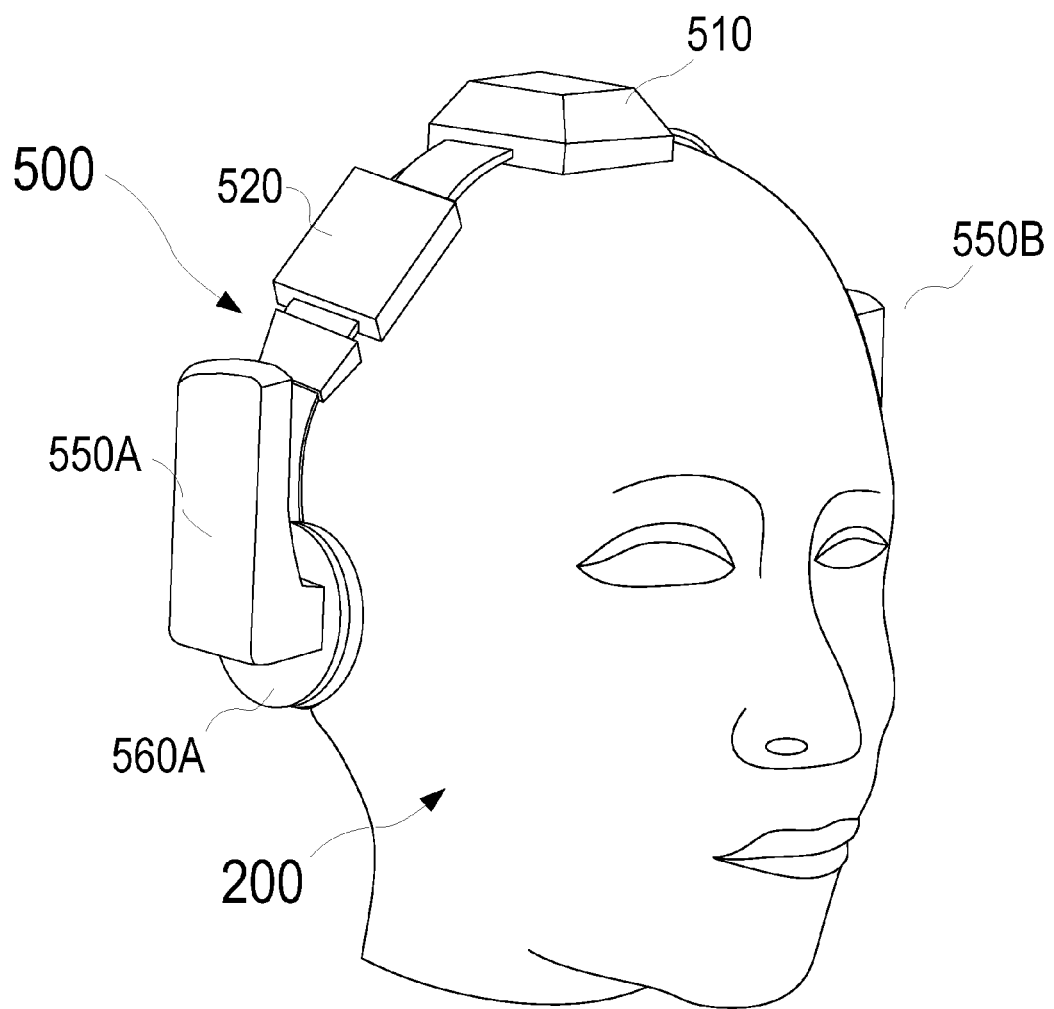
FIG. 5B is a perspective view of the head-mounted heading determination system of FIG. 5A as it would be worn by a user.

Referring now to FIGS. 5A and 5B, a head-mounted embodiment of a USBL heading determination system will be described. FIG. 5A shows USBL heading determination headphones (USBL headphones) 500 which are intended to be worn on a human head. GNSS modules 550A and 550B are mounted on each side of the USBL headphones 500. The GNSS modules 550A and 550B each house a circuit board which comprises of a GNSS receiver and antenna. Additional detail on the GNSS receivers and antennas and how they are mounted within the GNSS modules 550A and 550B will be discussed in connection with FIGS. 6B and 6C. The GNSS modules 550A and 550B are attached to opposite sides of a flexible headband 540 such that they sit on either side of a human head when being worn.

Additional circuit modules are mounted to the headband 540. A sensor cube module 510 is mounted on the top of the headband 540. This sensor cube module 510 contains the inertial measurement unit 460, the processor 400 (as shown in FIGS. 4A and 4B), and additional circuitry as further described in FIG. 6A. The sensor cube module 510 is mounted at the top of the headband 540 so as to ensure a location near the top and center of the body being tracked (typically a human head).

A ribbon cable 512 or similar connecting means provides logical connections between the sensor cube module 510 and left and right supplementary electronics modules 520, 530. The purpose of the supplementary electronics modules 520 and 530 is to provide additional circuit area for the USBL headphones 500 for support functions such as power handling and external connections. One embodiment of the circuitry found inside the sensor cube module 510 and the supplementary electronics modules 520 and 530 is illustrated in FIG. 6A.

The USBL headphones 500 also provide earpieces 560A and 560B. Earpieces 560A and 560B are typical earpieces found on standard commercially available headphones. The earpieces 560A and 560B are ideally cushioned to provide comfort when worn by a human, and may contain speakers (not shown) to provide audio to the human wearer. The optional audio capability of the USBL headphones 500 is not considered to be a part of the present invention and therefore no additional detail on this feature is provided.

FIG. 5B is a perspective view that shows the USBL headphone embodiment 500 as it would appear when worn by a human 200. This figure is provided to be illustrative and does not provide any additional detail on the USBL headphones 500 that was not present in FIG. 5A.

Figure 6A:
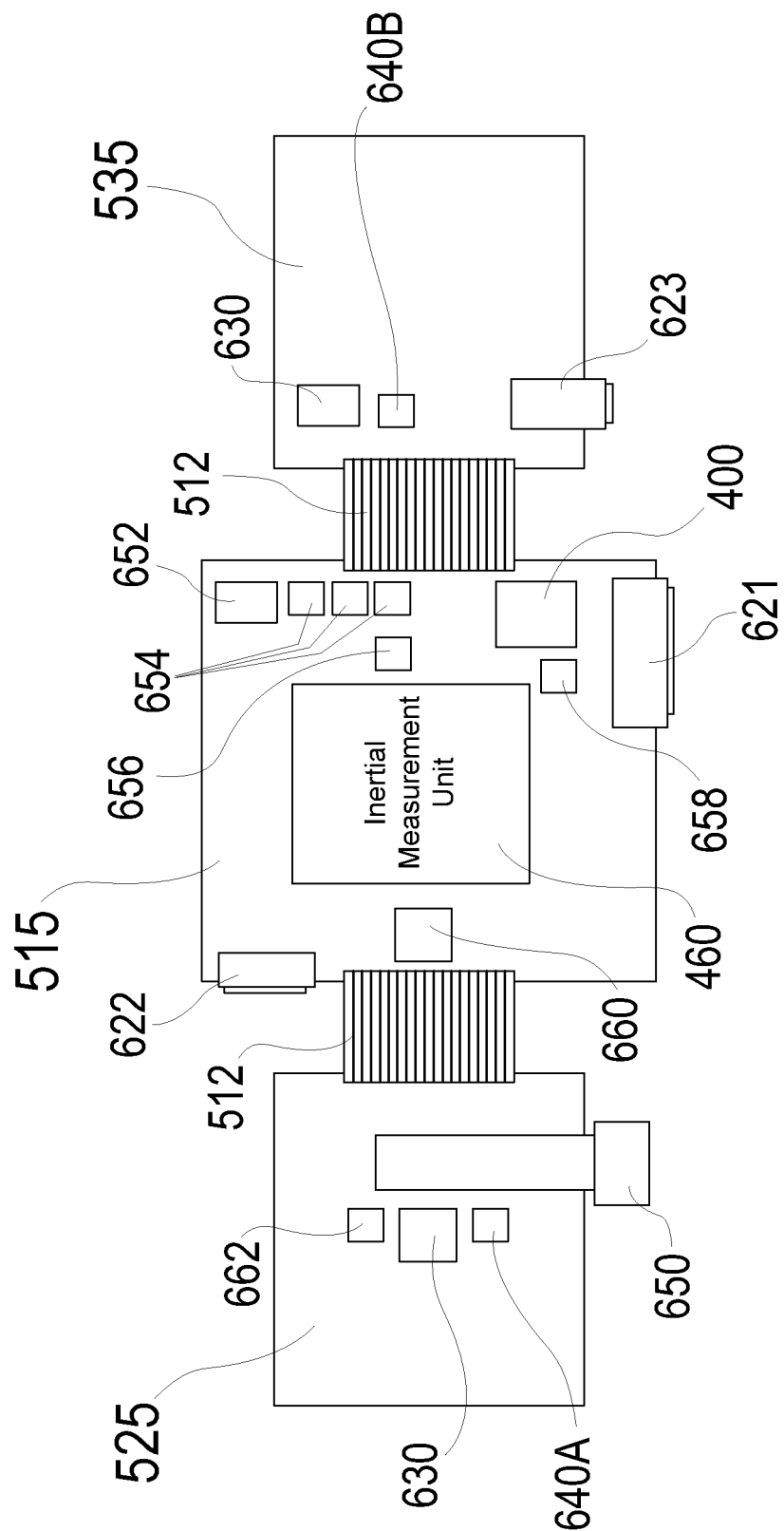
FIG. 6A is a top view of one embodiment of a set of circuit boards for use in a heading determination system such as that of FIG. 4A.

FIG. 6A is a top view of one embodiment of a set of circuit boards for use in a USBL heading determination system. The circuit boards illustrated here correspond to electronics modules on the USBL headphones 500 as shown in FIG. 5A. Specifically, the left supplementary circuit board 525 corresponds to the left supplementary electronics module 520, the right supplementary circuit board 535 corresponds to the right supplementary electronics module 530, and the sensor cube circuit board 515 corresponds to the sensor cube module 510. In at least one embodiment, circuit boards 515, 525, and 535 would be enclosed inside electronics modules 510, 520, and 530 from FIG. 5A, respectively.

Referring now to FIG. 6A, the sensor cube circuit board 515 houses the inertial measurement unit 460 and processor 400. Additional circuitry present on the sensor cube circuit board 515 includes power regulator circuits 654, battery switcher circuit 656, field effect transistors (FETs) 652, reset circuit 658, and a serial communications circuit 660, such as a CAN transceiver or similar communications device. In addition to these circuits, this embodiment of the sensor cube circuit board 515 includes connectors for communicating to external systems. A sensor cube connector 622 allows direct external connections to the sensor cube circuit board 515. A serial communications connector 621, such as a Universal Serial Bus (USB) connection, provides a pathway for the exchange of data with external systems.

The left supplementary circuit board 525 is connected to the sensor cube circuit board 515 via a ribbon cable 512. In one embodiment, the left supplementary circuit board 525 contains a pushbutton 650 to allow user control of on-board features. A pushbutton control circuit 662 processes presses of the pushbutton. The left supplementary circuit board 525 also contains a battery charger circuit 630, as well as an accelerometer 640A, which is used for calculating the current angle of the left side of the headband 540. The use of the accelerometer 640A is detailed in FIG. 8 in this document.

The right supplementary circuit board 535 is also connected to the sensor cube circuit board 515 via a ribbon cable 512. The right supplementary circuit board 535 contains a battery charger circuit 630 and an accelerometer 640B, similar to the left supplementary circuit board 525. The right supplementary circuit board 535 may offer a wall connector 623 that can accept an external power connection from a standard wall socket so that the USBL headphones 500 can be recharged.

Figure 6B:
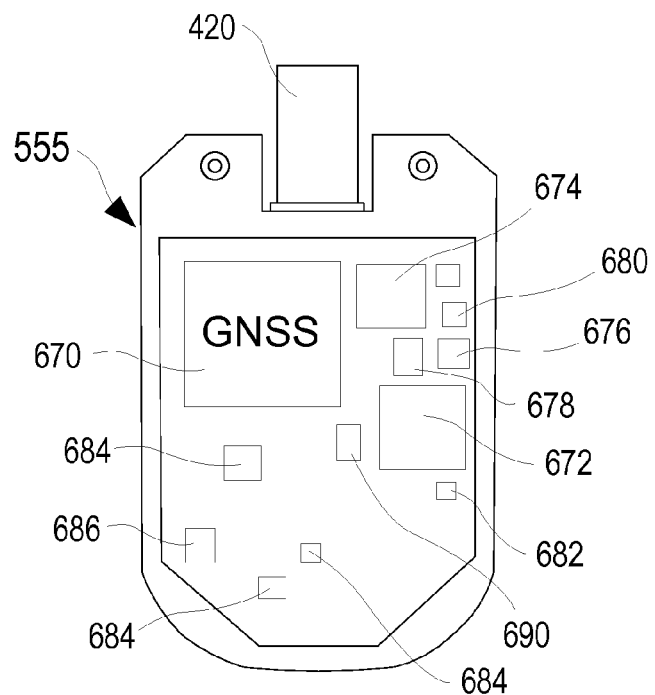
FIG. 6B is a front view of one embodiment of a GNSS receiver board for use in a heading determination system such as that of FIG. 4A.
Figure 6C:
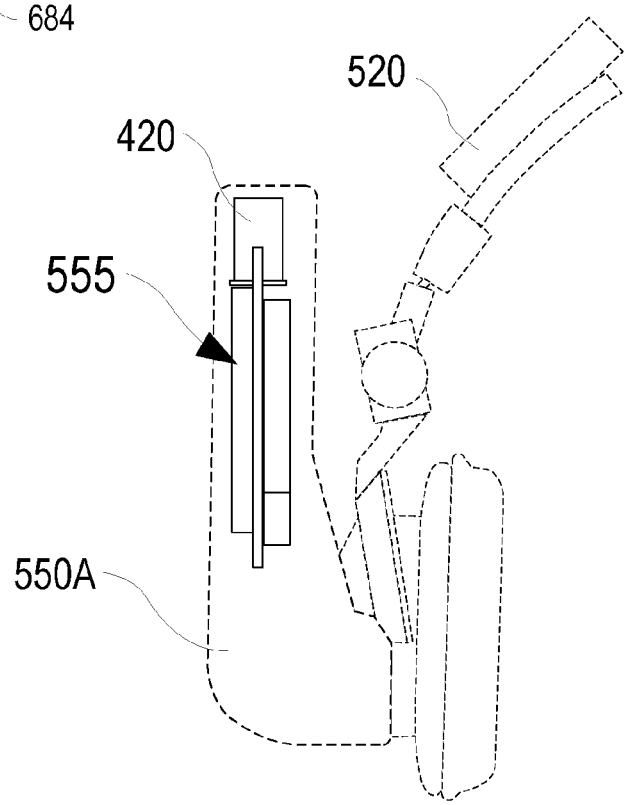
FIG. 6C illustrates one embodiment for how the GNSS receiver board of FIG. 6B might be used in a head-mounted heading determination system.

FIG. 6B is a top view of one embodiment of a GNSS circuit board 555 for use in a USBL heading determination system. The GNSS circuit board 555 illustrated here corresponds to and is enclosed in each of the GNSS modules 550A and 550B shown in FIG. 5A. Each of the GNSS modules 550A and 550B contains an exact duplicate of the GNSS circuit board 555. FIG. 6C illustrates how the GNSS circuit board 555 may be housed inside one of the GNSS modules 550A.

The GNSS circuit board 555 is connected via a ribbon cable or similar connection (not shown, but similar to ribbon cable 512 shown in FIG. 5A) to supplementary circuit boards 525 and 535. That is, one GNSS circuit board 555 is connected to the left supplementary circuit board 525, and a separate but identical GNSS circuit board 555 is connected to the right supplementary circuit board 535. This connection creates a "chain" of electronic circuit boards that completes the circuitry required for the USBL heading determination system, and which can be used in various configurations in addition to the USBL headphones 555. This circuit board chain consists of a first GNSS circuit board 555, a left supplementary circuit board 525, a sensor cube circuit board 515, a right supplementary circuit board 535, and a second GNSS circuit board 555. A second exemplary configuration of this circuit board chain is provided in FIG. 9B, which will be discussed later in this document.

Referring now to FIG. 6B, the details of one embodiment of a GNSS circuit board 555 will be presented. The GNSS circuit board 555 contains a GNSS receiver chip 670 and a passive GNSS antenna 420 for receiving and processing signals broadcast by plurality of GNSS satellites. A processor 672 provides control of all on-board functions, and is clocked by an oscillator chip 682. An accelerometer 676 is provided on the board so that the current orientation of the GNSS circuit board 555 can be calculated. The use of the accelerometer 676 is detailed in FIG. 8 in this document.

Additional circuitry provided on the GNSS circuit board 555 includes power regulators 684 and a power regulator conditioning circuit 686, a boundary scan (JTAG) test interface 690, a serial communications transceiver 678, a battery backup circuit 674, and optional user feedback circuit 680 (such as light emitting diodes).

The circuitry detail provided for the GNSS circuit board 555, as well as for the other circuit boards shown in earlier figures, is provided only for illustrative purposes and is not meant to be limiting.

FIG. 6C shows one embodiment of how the GNSS circuit board 555 would rest inside of the GNSS module 550A of the USBL headphones embodiment 500. The antenna 420 is positioned such that it is near the top of the GNSS module 550A, where it can best receive signals from a GNSS satellite system. Only one of the GNSS modules (550A) is shown in FIG. 6C, but the other GNSS module 550B would be a mirror image of 550A.

Figure 7A:
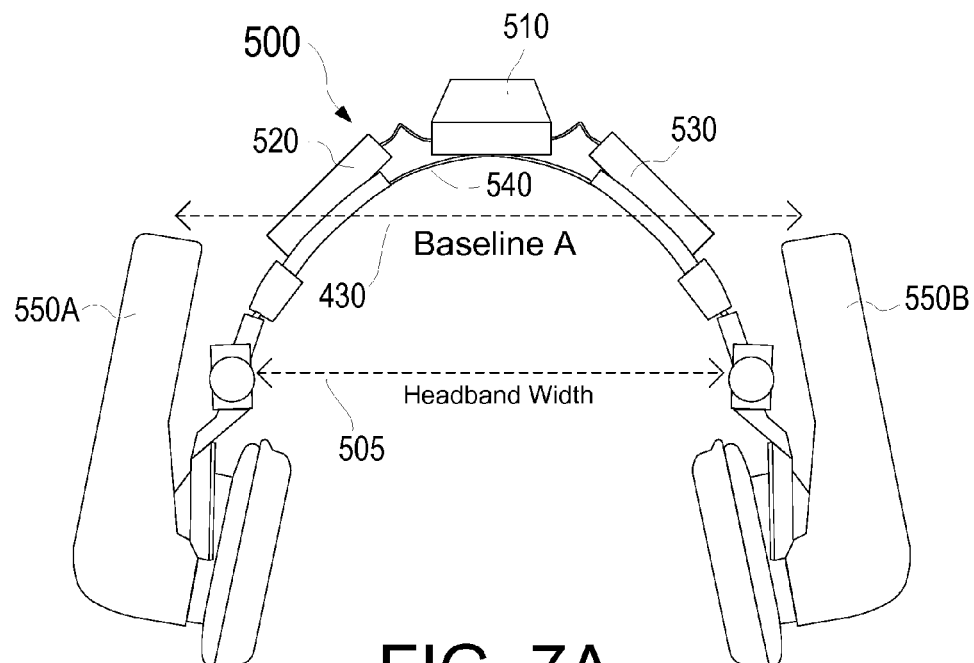
FIG. 7A illustrates one possible baseline length of a head-mounted heading determination system.
Figure 7B:
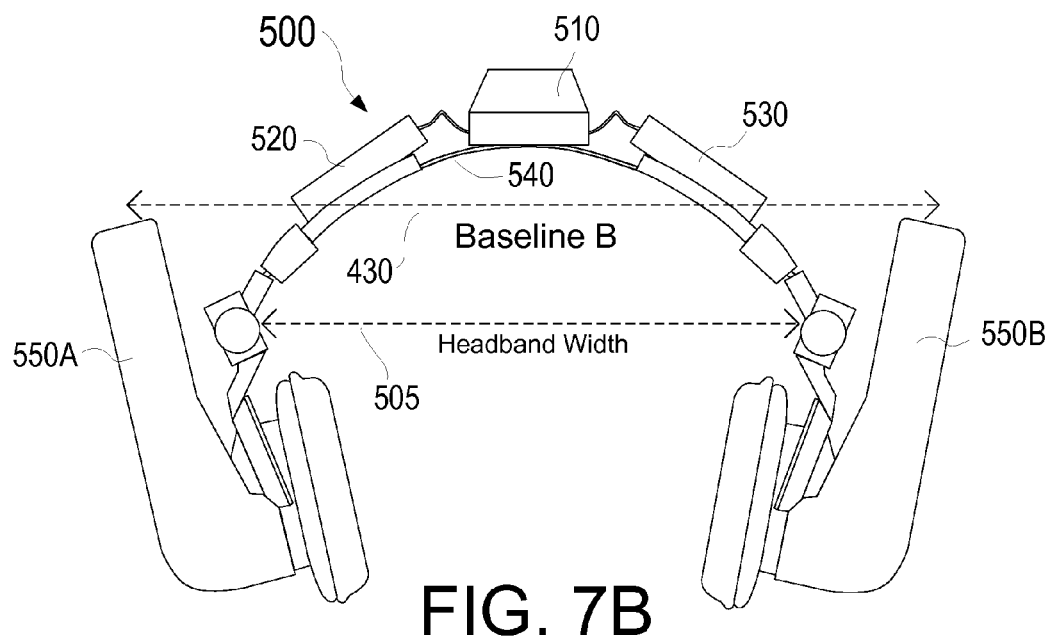
FIG. 7B illustrates a second possible baseline length of a head-mounted heading determination system.

To be able to calculate an accurate heading solution using two or more GNSS antennas separated by an ultra-short baseline, the exact length of the baseline (the distance between the antennas) must be known. In many embodiments of the USBL heading determination system, the GNSS antennas will be housed in a permanent, rigid enclosure wherein the antennas cannot move in relation to each other. In these rigid embodiments, the baseline length does not change, and the length can be "hard-coded" into the solution algorithms. In the case of the USBL headphones embodiment 500, however, the separation between the two GNSS antennas may change based on the shape and size of the wearer's head. FIGS. 7A and 7B provide illustrations of this dynamic baseline length.

FIG. 7A shows one possible configuration of the USBL headphones 500 first described in FIG. 5A. Headband 540 is flexible and will move to conform to the shape of the wearer's head. This means that the headband width 505 is variable, forcing the GNSS modules 550A and 550B farther apart when used on a wider head and closer together when used on a narrower head. In addition to the variable headband width 505, the GNSS modules 550A and 550B are also mounted on pivot points and the tops of the modules 550A and 550B may tilt in toward the wearer's head or out away from the wearer's head, depending on the shape of the wearer's head. Both of these factors contribute to changing the length of the USBL baseline 430.

FIG. 7A shows one possible baseline length 430, labeled as Baseline A. FIG. 7B shows a different configuration of the same USBL headphones 500, wherein the arrangement of the GNSS modules 550A and 550B and the shape of the headband 540 create a second possible baseline length 430, labeled as Baseline B. Obviously, there are a large number of possible baseline lengths 430 that could be generated on USBL headphones 500. In order to generate highly-accurate heading solutions, there must be some means for dynamically calculating the length of the baseline 430.

Figure 8:
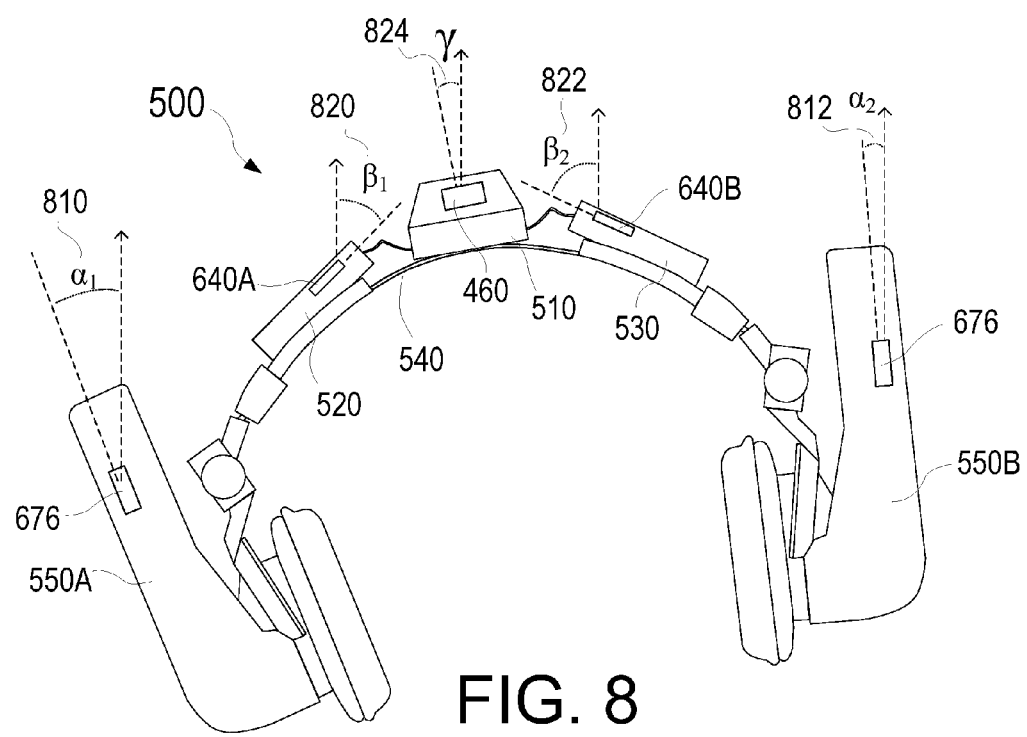
FIG. 8 shows one embodiment of a means for calculating the variable baseline separation between the antennas of a head-mounted heading determination system.

FIG. 8 illustrates one embodiment of just such a means for dynamically calculating the length of the USBL baseline 430. As previously described in FIGS. 5A and 6A, an accelerometer 640B is located inside of the right supplementary electronics module 530, mounted to the right supplementary circuit board 535 (a similar accelerometer 640A is mounted on the left supplementary circuit board 525, but this description will be limited to the right side of the USBL headphones 500, as the circuits and method are identical on both sides).

An accelerometer such as 640B is affected by the pull of gravity, which is seen by accelerometer 640B as an outside force in the same way that acceleration due to motion is seen. Normally, when the accelerometer 640B is mounted on a circuit board in a known orientation with respect to the center of the Earth, the accelerometer 640B will detect the pull of gravity as a constant force in a known direction in relation to the "normal" orientation of the accelerometer 640B. When the accelerometer 640B, however, is tilted in one direction or the other, the vector representing the effect of gravity will change relative to the orientation of the accelerometer 640B. The vector of the effect of gravity will remain pointing toward the Earth regardless of the orientation of the accelerometer 640B. This detected change in the gravity vector in relation to the normal orientation of the accelerometer 640B can be used to determine the new orientation of the accelerometer 640B given that the overall roll of the system is removed which is the IMU's roll. The angle between the accelerometer 640B and the vector representing the force caused by gravity, which we will refer to as "beta angle" 820, can be derived and compared to the expected angle to determine its orientation.

There is also an accelerometer 676 mounted on the GNSS circuit board 555, which is housed in the right GNSS module 550B. In a similar manner to that described in the previous paragraph, the change in the gravity vector can be used to calculate the orientation of the right GNSS module 550B as it tilts toward or away from the wearer. The angle between the accelerometer 676 and the vector representing the force caused by gravity, which we will refer to as "alpha angle" 810, can be derived and compared to the expected angle to determine its orientation.

By determining both the alpha angles 810 and the beta angles 820 from each side of the headset as described above, the exact configuration of the headband, and therefore the length of the USBL baseline, can be derived. Comparing the angles $\alpha_1$ 810 with $\alpha_2$ 812 and $\beta_1$ 820 with $\beta_2$ 822 should result in a uniform heading determination because the heading determination calculated based on information from both receivers should be identical. Taking into account the additional IMU angle measurement $\gamma$ 824 and the known force pulling against gravity will result in a precise heading determination.

Figure 9A:
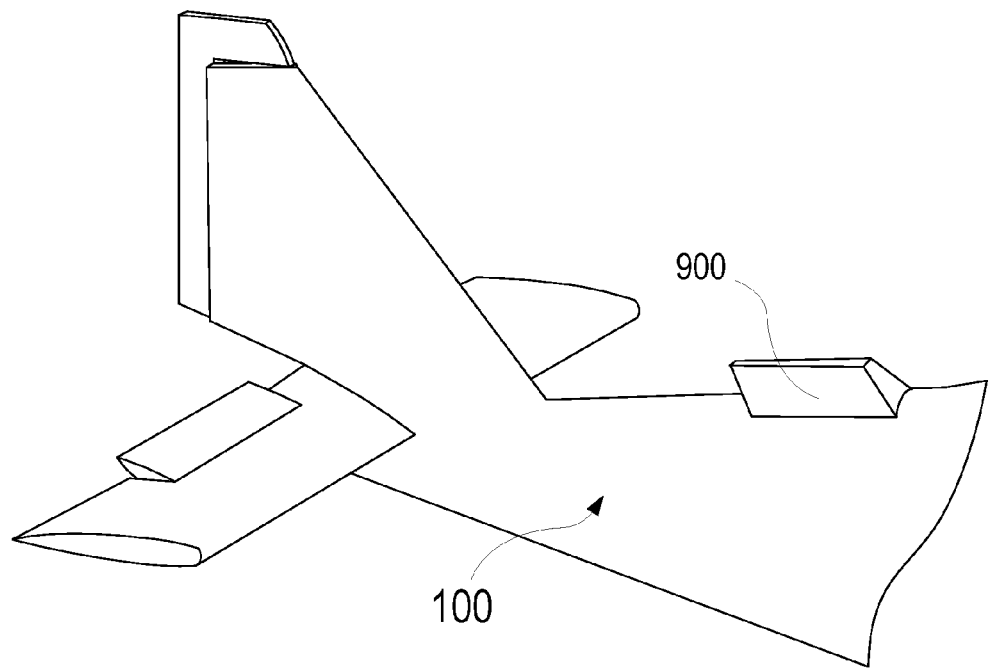
FIG. 9A shows one embodiment of an ultra-short baseline heading determination system as it might be mounted to the exterior of a vehicle.
Figure 9B:
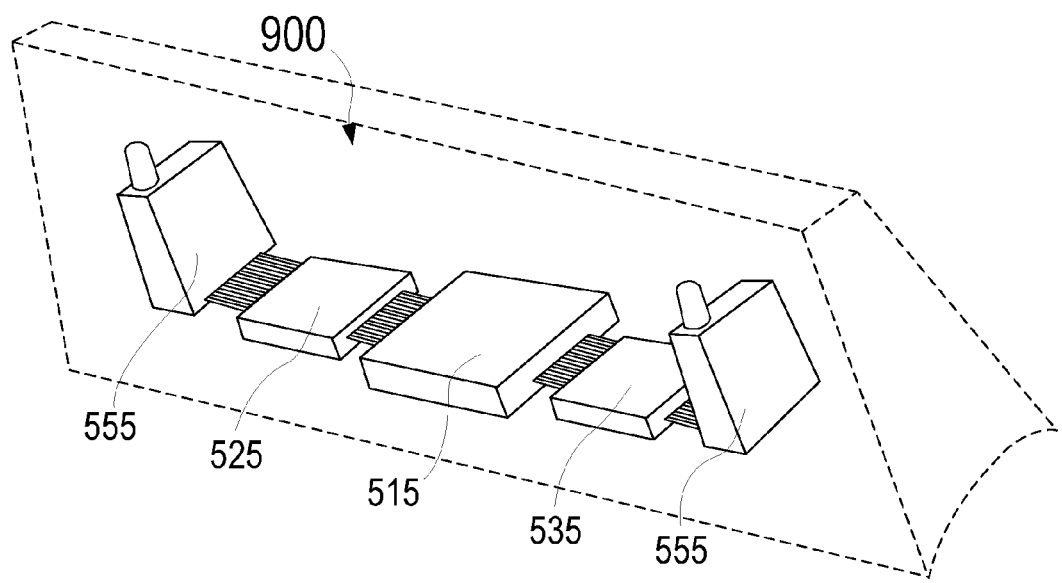
FIG. 9B shows one embodiment of how the system components might be arranged inside the vehicle-mounted ultra-short baseline heading determination system of FIG. 9A.

FIGS. 9A and 9B illustrate an alternative embodiment of the USBL heading determination system. Referring to FIG. 9A, an externally-mounted USBL module 900 is shown mounted on the exterior surface of a vehicle 100. The vehicle 100 shown in FIG. 9A is an aircraft (in this case, only the tail section or empennage of the aircraft is shown) but it would be obvious to one skilled in the art that the vehicle 100 could be any appropriate vehicle or means of transportation, including an automobile, bicycle, golf cart, helicopter, etc. The externally-mounted USBL module 900 is long enough to accommodate the baseline required for the USBL module 900. This "fin" shape is shown by way of example, and is not meant to be limiting. Any appropriate shape could be used for the USBL module 900, provided that it accommodates the required baseline length and does not significantly hinder the performance or aerodynamics of the vehicle 100.

Internal details of one embodiment of an externally-mounted USBL module 900 are shown in FIG. 9B. The internal components of the USBL module 900 are similar or identical to the major components of the head-mounted USBL heading determination system shown in FIG. 5A. Two GNSS circuit boards 555 are placed at either end of the USBL module 900, separated by an appropriate distance (meeting the definition of an ultra-short baseline as defined in this document). A left supplementary circuit board 525, a sensor cube circuit board 515, and a right supplementary circuit board 535 are also present to provide the appropriate functionality as previously described in this document. It should be noted that circuitry equivalent to that represented by functional blocks 555, 525, 515, and 535 can be arranged on any number of circuit boards or appropriate substrates, and do not have to be arranged in the discrete units shown here. It would be possible, for example, to arrange all of the appropriate circuits onto a single circuit board of appropriate length, instead of the five discrete units shown in FIG. 9B.

Figure 10:
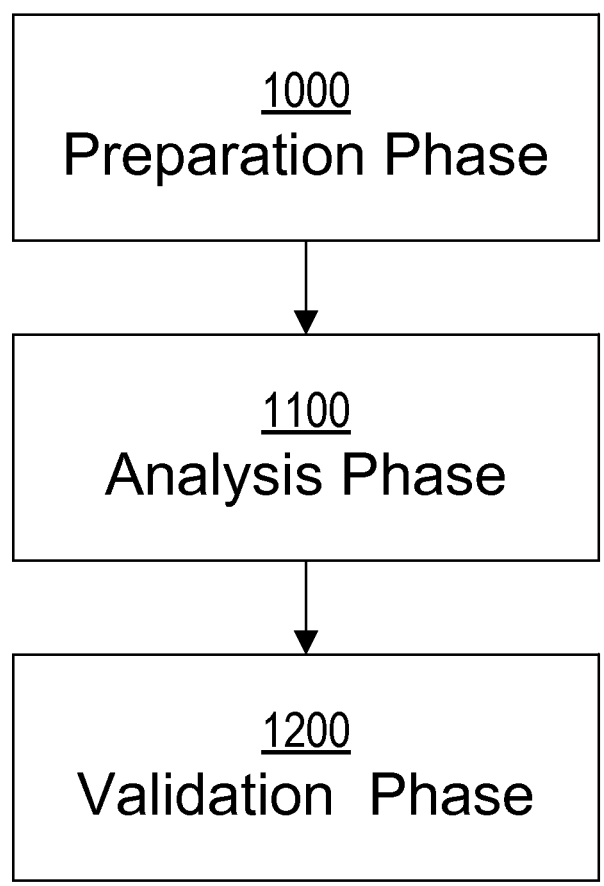
FIG. 10 is a high-level flowchart showing the categories of algorithms used in one embodiment of an ultra-short baseline heading determination system.

FIG. 10 is a high-level flowchart showing the categories of algorithms used in one embodiment of a USBL heading determination system. In this embodiment, there are three major phases of defined USBL algorithms required to derive an accurate heading solution. First, there is a preparation phase 1000, in which satellite signals are acquired and the timing and synchronization of the data is determined. Then there is an analysis phase 1100, in which the heading solution is derived. Finally, there is a validation phase 1200, in which the heading solution is validated using redundant data sources and by comparing it to historical data trends. Additional detail on each of these phases is provided in FIGS. 11A, 11B, and 11C.

Figure 11A:
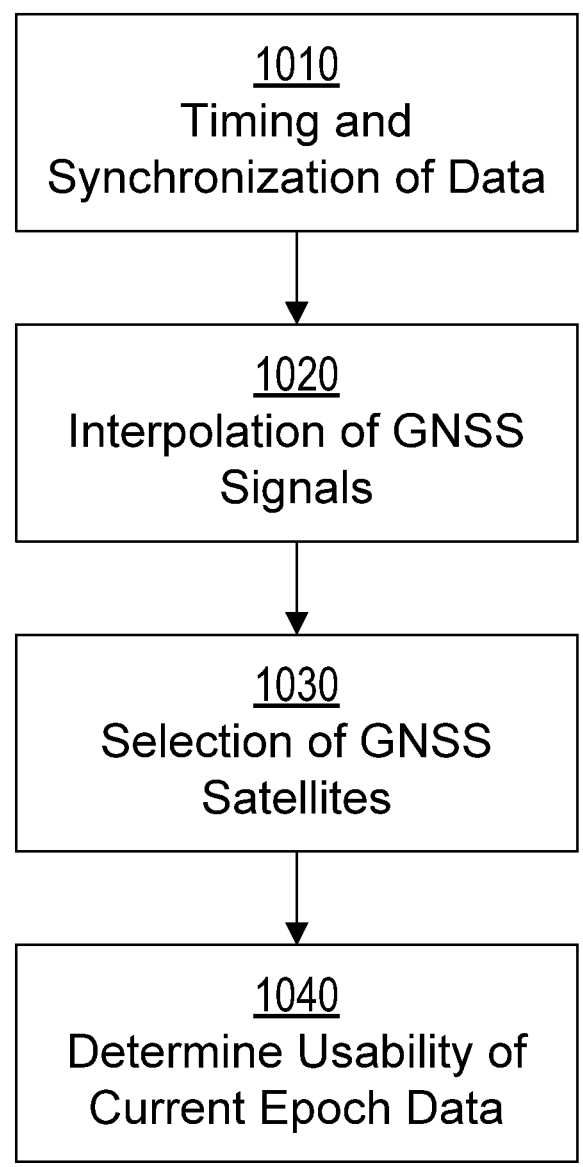
FIG. 11A is a high-level flowchart showing the algorithms used in the preparation phase of an ultra-short baseline heading determination system.

FIG. 11A is a high-level flowchart showing the algorithms used in the preparation phase 1000 of a USBL heading determination system. The first step in the preparation phase 1000 is the timing and synchronization of data 1010. Data acquired from the GNSS system and the IMU must be synchronized to the same time frame. There are also inherent delays in the system, including GNSS receiver computation time, transmission time, USBL solution computation time, and IMU processing time. These delays will introduce error into the heading calculation and must be compensated for.

The second step in the preparation phase 1000 is the interpolation of GNSS receiver signals 1020. The measurements reported by the two (or more) GNSS receivers may differ by several milliseconds, and this difference could introduce error. The GNSS receivers report a nanosecond parameter which will be used to perform an interpolation of receiver values. For example, if the signal from GNSS receiver 1 is time stamped after the signal from GNSS receiver 2, then the data from GNSS receiver 1 is interpolated to receiver 2's current time mark using data from receiver 1's previous and current epoch.

The third step in the preparation phase 1000 is the selection of GNSS satellites 1030. The locations and number of satellites viewed by the two GNSS receivers is almost never the same. There needs to be a way to choose the best satellites for USBL calculations, keeping in mind that from six to twelve satellites are typically in view from any place on Earth, and four satellites are needed at a minimum to compute a heading solution.

The more satellites in view, the more likely there will be a high quality set of satellites available with which to compute the attitude corrections. However, each extra satellite used in the algorithm will add additional processing time and complexity. A ranking system based on factors that give the best results is needed before calculations are even started. The ranking system should dynamically change between calculations as needed based on the results. In the preferred embodiment, there are eight factors that are taken into consideration each epoch to determine the best satellite set to use for an accurate solution. These factors include the elevation of the satellite relative to the receivers' location and attitude, the satellites azimuth angle relative to the receiver's location compared to the azimuth angles of other satellites relative to the receivers, recent cycle slips (instantaneous loss of lock on one or more carrier signals) seen by a satellite, the health of the satellite, the signal-to-noise ratio of the incoming satellite signals, the age of the ephemeris and almanac parameters, the age of the satellite (determined based on the satellite's id number), and the calculated integer ambiguity confidence.

The fourth and final step in the preparation phase 1000 is determining the usability of the data obtained during the current epoch 1040. This analysis is based on the number of satellites available and the projected quality of the data from the selected satellites. If the data is determined to be unusable for a given epoch, the data from that epoch will not be used.

Figure 11B:
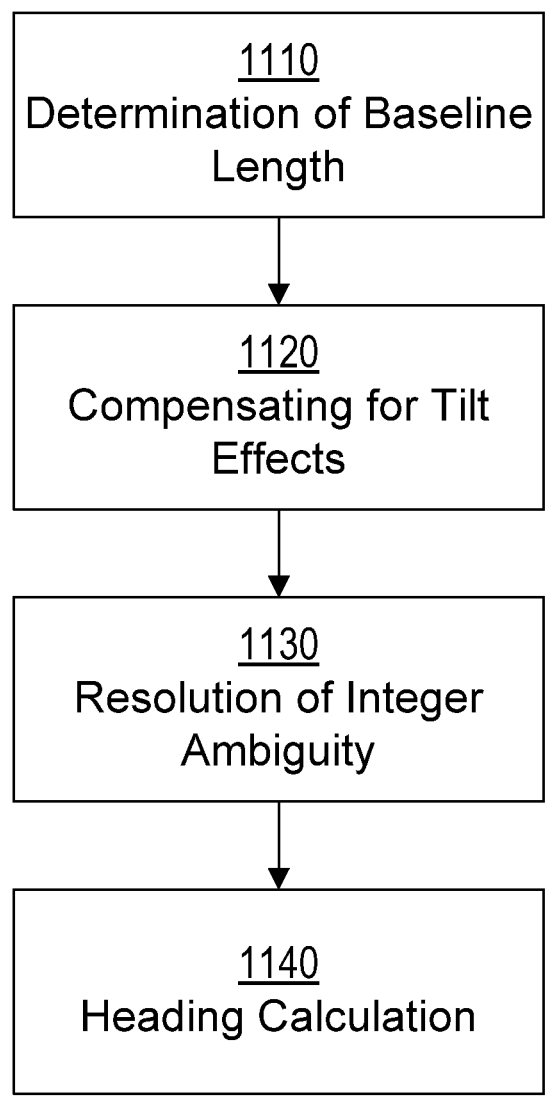
FIG. 11B is a high-level flowchart showing the algorithms used in the analysis phase of an ultra-short baseline heading determination system.

FIG. 11B is a high-level flowchart showing the algorithms used in the analysis phase 1100 of a USBL heading determination system. The first step in the analysis phase 1100 is the determination of the USBL baseline length 1110. USBL heading determination systems with fixed, rigid configurations will have fixed baseline lengths that can be hard-coded into the algorithm. In flexible systems such as the USBL headphones 500, the baseline determination method detailed in FIG. 8 can be used to complete this step.

The second step in the analysis phase 1100 will be to compensate for tilt effects 1120. This algorithm will depend on data received from the inertial measurement unit to determine the pitch and roll of the system. When the USBL heading determination system pitches and rolls, the positional relationship of the two (or more) GNSS antennas and available satellites will change. These tilt effects must be compensated for in order to achieve an accurate heading solution. When antenna/receiver pairs are added to the system beyond the minimum of two, the tilt effects can be derived from a second or third baseline.

The third step in the analysis phase 1100 is the resolution of the integer ambiguity 1130 inherent in a USBL GNSS system with multiple antennas. Because the GNSS satellite signals are repetitive (cyclic), it is difficult to tell if a difference in two received signals is relatively small (within the same epoch) or somewhat larger (a comparison of signals from two different epochs). A standard integer ambiguity resolution algorithm will be applied to resolve these ambiguities.

The fourth step in the analysis phase 1100 is the determination of the heading 1140. One embodiment of the equation used for the heading calculation is shown below. This heading calculation equation is dependent on double difference phase measurements, baseline length, and both satellites' elevations and azimuths.

$$\text{Heading}_1 = \arccos(C) + T$$

$$\text{Heading}_2 = \arccos(-C) + T + \pi$$

-continued $$C = \frac{P}{B\sqrt{D_1^2 + D_2^2}}$$

$$T = \arctan\left(\frac{D_1}{D_2}\right)$$

B=Baseline Length
P=Double Difference Phase Measurement Length
$D_1 = \cos(E_1+R)\cos(A_1) - \cos(E_2+R)\cos(A_2)$
$D_2 = \cos(E_1+R)\sin(A_1) - \cos(E_2+R)\sin(A_2)$
$E_1$=Elevation of satellite 1 $E_2$=Elevation of satellite 2
$A_1$=Azimuth of satellite 1 $A_2$=Azimuth of satellite 2
R=Roll Angle Double differencing, as mentioned above, is a data processing procedure by which first single differences need to be made. This is done by differencing the pseudo-range or carrier phase measurements of one satellite that are made simultaneously by two GNSS receivers. This reduces the atmospheric errors and removes satellite clock errors. The double difference is made by then differencing two single differences from two different satellites. This removes the receivers' clock errors and significantly any remaining atmospheric errors. The resulting double difference value is used in the equation above for heading determination.

Assumptions made in the above equations are that Satellite 2 is subtracted from Satellite 1 to create the double difference measurements, and that all angles are in radians. The inverse cosine function (Arcos) has a 1-to-2 correspondence, which means given a double difference phase the equations produce two headings to choose from. Only one of these heading solutions will be the correct one. When compared across multiple double difference measurements, one solution will be similar across them all, and will therefore be the correct heading solution.

Figure 11C:
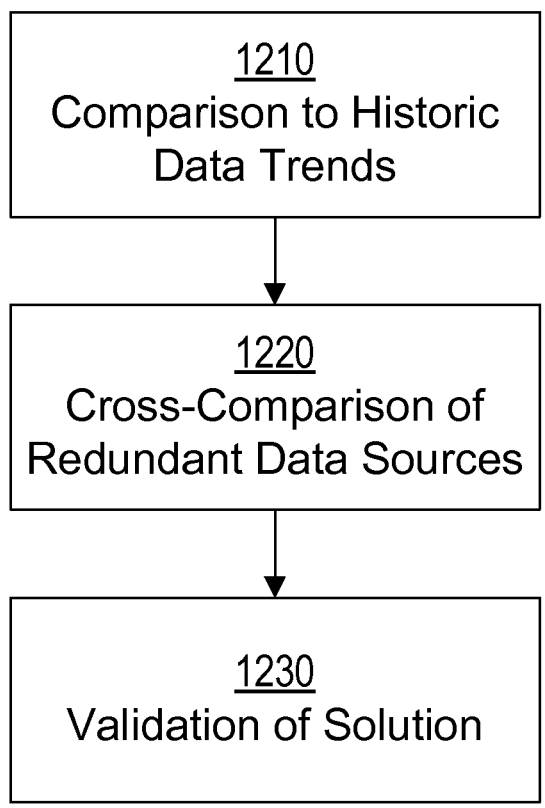
FIG. 11C is a high-level flowchart showing the algorithms used in the validation phase of an ultra-short baseline heading determination system.

FIG. 11C is a high-level flowchart showing the algorithms used in the validation phase 1200 of a USBL heading determination system. It is in this phase that the heading solution derived during the analysis phase 1100 is validated. The first step in the validation phase 1200 is the comparison of the new solution to historic data 1210 to see if the new solution seems reasonable. If the new heading solution shows a sudden shift that is not consistent with the historic heading data, it is possible that the solution is invalid. This depends, of course, to what the USBL heading determination system is mounted. A USBL heading determination system worn on a human head will be subject to sudden, even jerky shifts in heading that a large vehicle might be incapable of performing.

The second step in the validation phase 1200 is the cross-comparison of redundant data sources 1220 as a form of "validity check" for the new heading calculation. For example, the USBL heading determination system may have a built-in magnetic compass that can be used as a redundant source of heading data.

The third and final step in the validation phase 1200 is the final validation of the solution 1230. When the heading solution is validated, it can be stored in internal memory or secondary storage, or transmitted to an external system.

Figure 12:
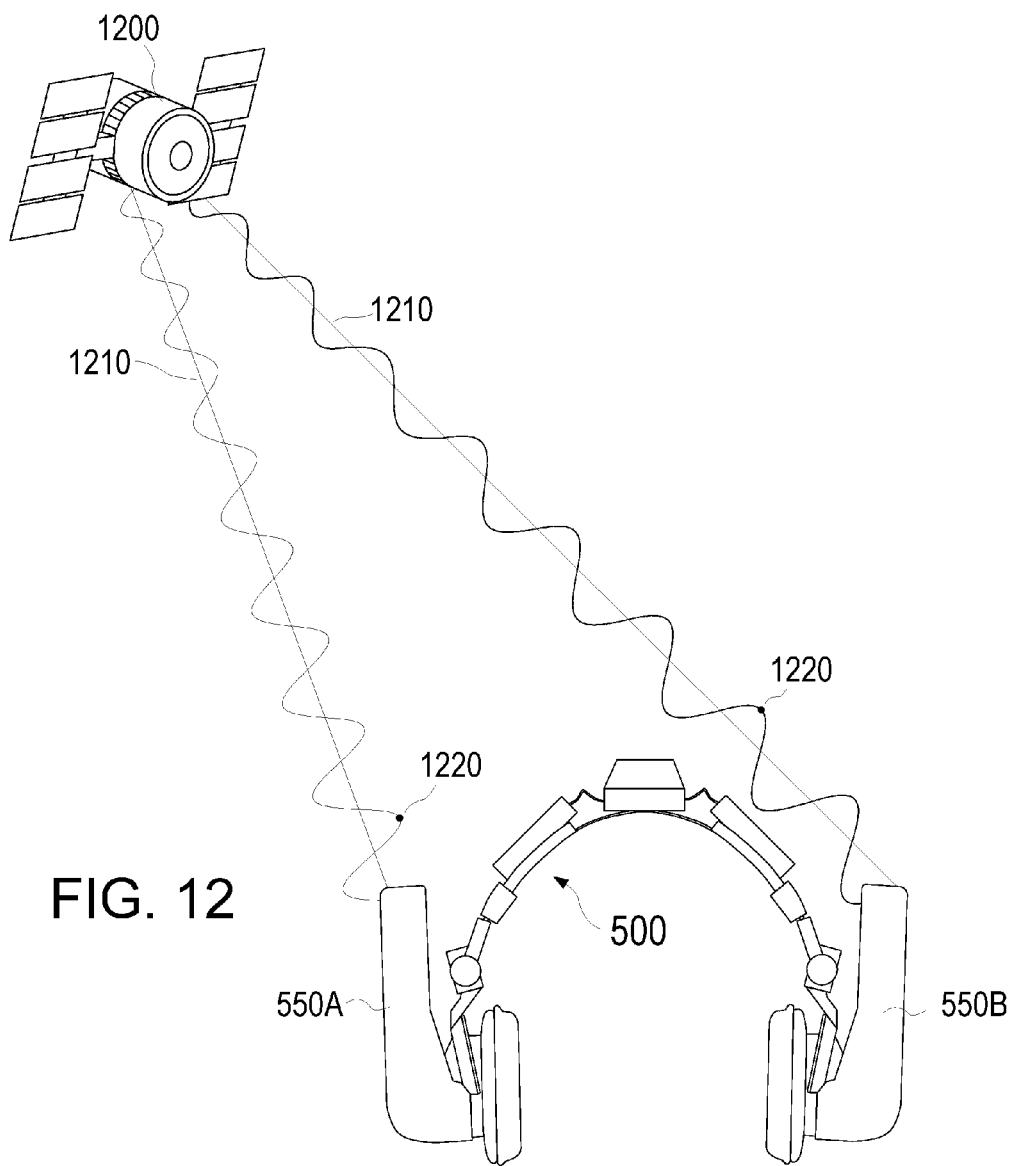
FIG. 12 is a perspective view of how signals from a GNSS satellite are received by an ultra-short baseline heading determination system.

FIG. 12 is a simplified perspective view of how signals from a GNSS satellite are received by a USBL heading determination system. Unlike FIGS. 13A & B below which demonstrate satellite transmission signal waves approaching an embodiment of the present invention in a wavefront formation, FIG. 12 shows the satellite transmission signals as sinusoidal waves travelling along straight lines. A GNSS satellite 1200 continuously broadcasts a GNSS signal 1210. The GNSS signal 1210 is shown in FIG. 12 as two separate signals, but in reality the GNSS signal 1210 is a single broadcast that emanates in all directions away from the GNSS satellite 1200. The GNSS signal 1210 is received by the two GNSS modules 550A and 550B located on either side of a set of USBL headphones 500. Depending on the orientation of the USBL headphones, it is probable that the GNSS signal 1210 will arrive at one GNSS module (for example, 550A) before it arrives at the other GNSS module (for example, 550B). For illustrative purposes, a point 1220 on the GNSS signal 1210 is shown approaching the two GNSS modules 550A and 550B. Since GNSS module 550B is facing away from the GNSS headphones 500 (in this example), signal point 1220 will arrive at GNSS module 550B some time after the point 1220 arrives at GNSS module 550A. It is this difference in phase detected by the two GNSS modules 550A and 550B that allows the system to calculate an accurate heading as described in this document.

Figure 13A:
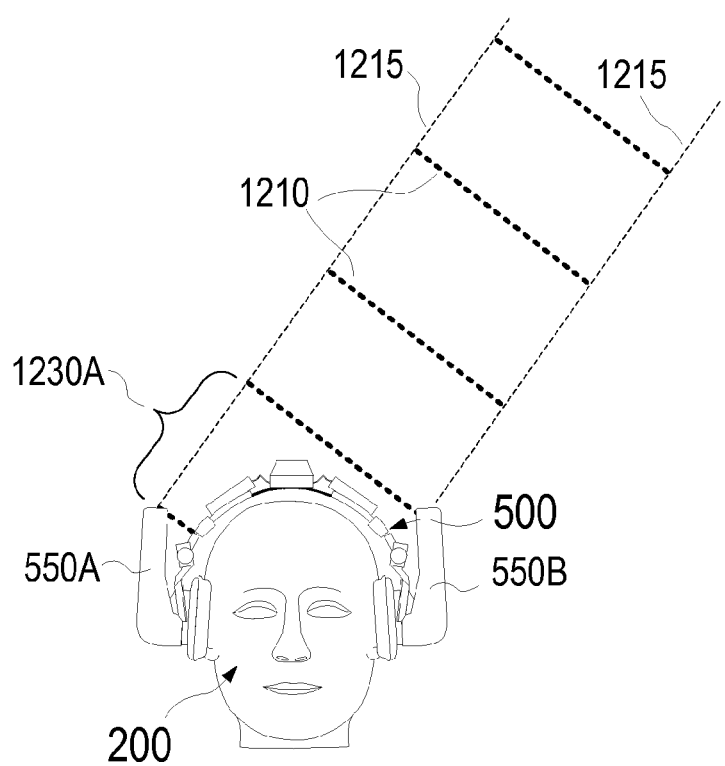
FIG. 13A illustrates how a signal from a GNSS satellite may be received by the two receivers of an ultra-short baseline heading determination system at slightly different times and out of phase.

FIG. 13A illustrates how a signal from a GNSS satellite may be received by the two receivers of an ultra-short baseline heading determination system at slightly different times and out of phase. A GNSS signal 1210 is broadcast from a GNSS satellite (not shown). The GNSS signal 1210 is shown in FIG. 13A as a series of "wavefronts" approaching a USBL heading determination system such as the USBL headphones 500 shown. A dashed line 1215 represents the path of the incoming GNSS signal 1210 as seen by each of the two GNSS modules 550A and 550B as it approaches from a GNSS satellite (not shown). The dashed lines 1215 are added for clarity and are intended primarily to show the direction of the incoming GNSS signal 1210 for discussion purposes.

Because of the angle of the incoming GNSS signal 1210, the signal 1210 reaches GNSS module 550B before it reaches GNSS module 550A (in this example). This difference in receiving time between the GNSS modules 550B and 550A is the single difference phase measurement 1230A.

Figure 13B:
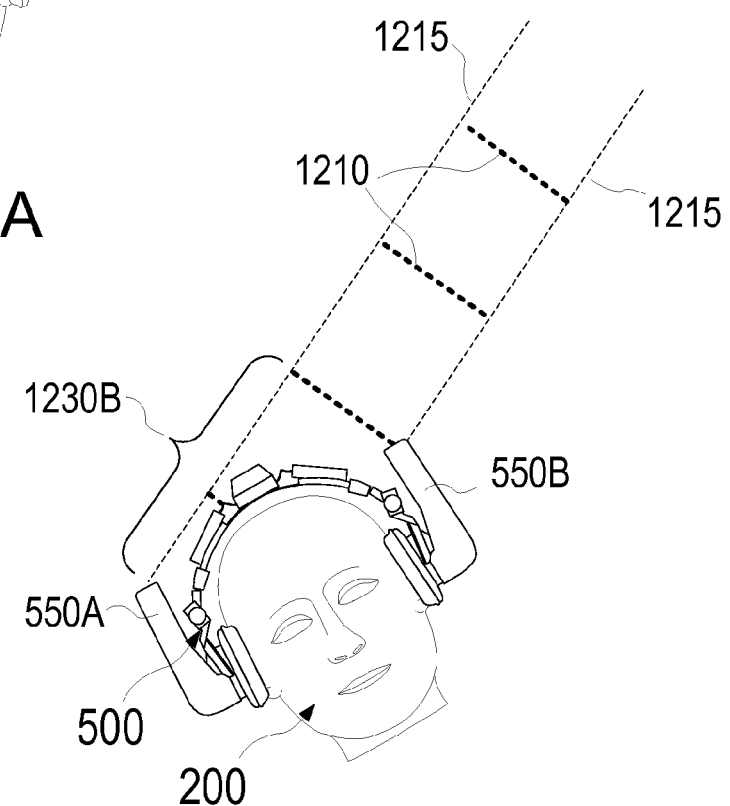
FIG. 13B illustrates how roll about the x-axis may change the amount of phase difference seen by the two receivers of an ultra-short baseline heading determination system.

The amount of tilt experienced by a USBL heading determination system will affect the calculated single difference phase measurement. FIG. 13B shows how roll about the x-axis can change the amount of phase difference seen by two receivers. A human 200 wearing a set of USBL headphones 500 tilts their head to one side. The amount of tilt shown in FIG. 13B compared to that shown in FIG. 13A is approximately 30 degrees. This tilt (caused by rolling about the x-axis) has the effect of moving GNSS module 550A farther away from the path 1215 of the GNSS signal 1210 and GNSS module 550B closer to the path 1215. The phase difference 1230B shown in FIG. 13B is therefore longer than the phase difference 1230A shown in FIG. 13A. It should be noted that with respect to the USBL head apparatus embodiment, roll is the controlling tilt and pitch will have no effect on the calculations; whereas with the externally mounted vehicle USBL embodiment, pitch effects the calculations where roll does not.

Figure 14:
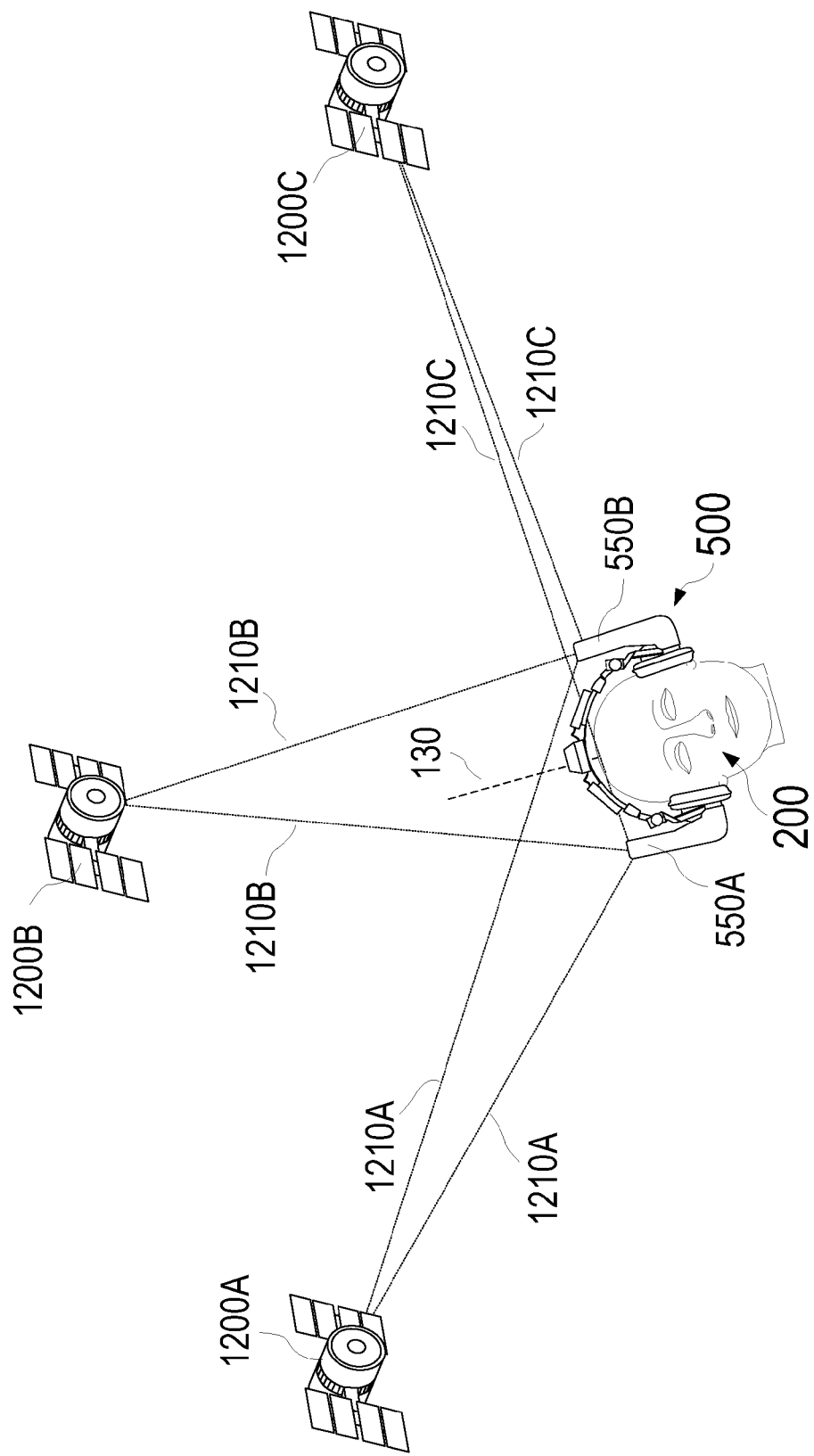
FIG. 14 is a perspective view illustrating how signals from multiple GNSS satellites may be received by an ultra-short baseline heading determination system.

FIG. 14 illustrates how signals from multiple GNSS satellites are received by a USBL heading determination system. The satellite transmission signals are represented by straight lines. For the purposes of discussion, three separate GNSS satellites are shown, labeled as 1200A, 1200B, and 1200C. The number of satellites shown is meant as an example and is not meant to be limiting in any way. The GNSS satellite signals broadcast by satellites 1200A, 1200B, and 1200C are labeled as 1210A, 1210B, and 1210C, respectively.

A human 200 is shown wearing a set of USBL headphones 500. USBL headphones 500 are just one possible configuration of a USBL heading determination system, and is used here as an example. Any appropriate configuration of a USBL heading determination system can be used instead of USBL headphones 500.

The human head 200 is shown at a slight roll (rotation about the x-axis, caused by the human 200 tilting their head to one side). The x-axis would be coming up out of the figure (perpendicular to the page) and is thus not shown in FIG. 14. However, the x-axis is identical to that shown in FIG. 2.

As previously described in the detail and corresponding equation of FIG. 11B, a heading solution is derived by calculating the double difference phase measurement of pairs of satellites. For example, the USBL heading determination system (headphones 500) could first determine the single difference phase measurement from satellite 1200A, and then determine the single difference phase measurement from satellite 1220C. It could then subtract the single difference phase measurement of one satellite from that of the other to create the double difference phase measurement for satellites 1200A and 1200C. The USBL headphones 500 can then create similar double difference phase measurements for other pairs of satellites, such as 1200A-1200B and 1200B-1200C.

However, the angle of the USBL headphones 500 relative to the incoming signals 1200A, 1200B, and 1200C may be such that some of the satellites may be unusable. For example, when a GNSS satellite is directly overhead in the sky relative to the USBL headphones 500, there will be no observable change in single difference phase measurement derived for that satellite when the human 200 rotates about the z-axis 130 (that is, when the human 200 changes heading). For example, satellite 1200B is shown to be almost directly above USBL headphones 500 in FIG. 14. Therefore, when the human 200 rotates about the z-axis 130, the distance between satellite 1200B and GNSS receivers 550A and 550B remains unchanged, and so the phase measurement remains unchanged. Satellite 1200B, therefore, will not contribute to the heading solution.

Similarly, satellites which are too close to the horizon may also be unusable. This is caused in part by signal reflections and multi-path effects caused by the signal's proximity to the Earth's surface and structures and features near the horizon. Ideally, satellites with elevations between about 15 degrees and 75 degrees are used to perform the calculations.

It should be noted that the roll of the head 200 and USBL headphones 500 will alter the relative positions of the satellites to the system. The satellite selection algorithm defined in the discussion of FIG. 11A will evaluate the relative positions of the satellites in order to select the set of satellites which will give the best possible heading solution. The USBL heading determination system will take advantage of the information received from its inertial measurement unit 460 (as first shown in FIG. 3) to determine the amount of roll and pitch currently affecting the system, and will compensate for these offsets accordingly. Various combinations of antennas could be provided and switched among to accommodate various attitudes of the object of interest for maximum benefit in heading determination and satellite visibility.

Having described the preferred embodiments, it will become apparent that various modifications can be made without departing from the scope of the invention as defined in the accompanying claims. In particular, it would be obvious to one skilled in the art that the USBL heading determination system can take on many form factors other than those described in the drawings and specifications. The only requirement for the form factor of the invention as described herein is that there are at least two GNSS receivers, each with its own corresponding antenna, and that the antennas are separated by some distance typically less than half a meter. The GNSS receivers themselves can be packaged in any appropriate manner, and may share a single enclosure along with the other electronic components described herein, or each component may have its own enclosure. The GNSS antennas may be mounted in one location (such as on an exterior surface of a vehicle), and the other electronic components in a separate, remote location (such as the interior surface of a vehicle). The USBL heading determination system, or components thereof, may be mounted along any appropriate axis of a vehicle or moving object, and do not have to be mounted in parallel with a specific axis as described or shown herein.

In addition to the head-mounted configuration described in FIG. 5A and the "fin" version described in FIG. 9A, alternate form factors of the USBL heading determination system may include a "wart" or elongated bump on the outer surface of a vehicle, a horizontal bar such as the spoiler on a race car, or any form factor appropriate for a given application. The USBL heading determination system may also be built into a structure already present on a vehicle or platform, such as a wing, fender, nosecone, landing strut, fuselage, empennage, cab, cockpit, or any other appropriate structure.

The examples and processes defined herein are meant to be illustrative and describe only particular embodiments of the invention.

What is claimed:

1. A heading determination system comprising:
an inertial measurement unit (IMU) adapted for detecting a magnitude and a direction of movement of the system about an axis of rotation and providing an output signal corresponding to said movement magnitude and direction;
at least two GNSS receivers each providing an output comprising GNSS ranging signals;
at least two GNSS antennas each attached to a respective GNSS receiver;
each GNSS antenna having a baseline separation from every other GNSS antenna that is no more than 0.5 meters;
a processor connected to said IMU and said receivers, wherein the processor receives output data from the IMU and GNSS receivers and uses said output data to calculate a heading of the heading determination system; and
said processor adapted for calculating the baseline separation between said at least two GNSS antennas in real time.

* * * * *